United States Patent
Lam et al.

(10) Patent No.: US 7,289,701 B2
(45) Date of Patent: Oct. 30, 2007

(54) INTEGRATED PLATFORM FOR PASSIVE OPTICAL ALIGNMENT OF SEMICONDUCTOR DEVICE WITH OPTICAL FIBER

(75) Inventors: Dennis Lam, Hong Kong (HK); Flora Ho, Hong Kong (HK); S. K. Lam, Hong Kong (HK); Franklin Tong, Hong Kong (HK)

(73) Assignee: SAE Magnetics (Hong Kong) Limited, Shatin, N.T. (HK)

( * ) Notice: Subject to any disclaimer, the term of this patent is extended or adjusted under 35 U.S.C. 154(b) by 0 days.

(21) Appl. No.: 10/386,435

(22) Filed: Mar. 13, 2003

(65) Prior Publication Data

US 2004/0017977 A1 Jan. 29, 2004

Related U.S. Application Data

(60) Provisional application No. 60/363,880, filed on Mar. 14, 2002.

(51) Int. Cl.
 *G02B 6/30* (2006.01)
 *G02B 6/42* (2006.01)
(52) U.S. Cl. .......................... 385/49; 385/88
(58) Field of Classification Search ................. 385/14, 385/33, 49, 88–94, 65, 83
See application file for complete search history.

(56) References Cited

U.S. PATENT DOCUMENTS

| | | | | |
|---|---|---|---|---|
| 5,432,877 A | * | 7/1995 | Sun et al. ..................... 385/33 |
| 5,537,504 A | * | 7/1996 | Cina et al. ..................... 385/93 |
| 5,537,507 A | * | 7/1996 | Mariner et al. .............. 392/389 |
| 5,911,022 A | * | 6/1999 | Plickert et al. ................ 385/49 |
| 5,987,202 A | * | 11/1999 | Gruenwald et al. ........... 385/49 |
| 6,086,263 A | * | 7/2000 | Selli et al. ..................... 385/88 |
| 6,137,158 A | * | 10/2000 | Cohen et al. ................ 257/666 |
| 6,572,935 B1 | * | 6/2003 | He et al. ..................... 427/577 |
| 6,786,651 B2 | * | 9/2004 | Raj et al. ....................... 385/88 |
| 6,813,418 B1 | * | 11/2004 | Kragl ........................... 385/49 |

FOREIGN PATENT DOCUMENTS

JP          03036508 A  *  2/1991

* cited by examiner

*Primary Examiner*—Sarah Song
(74) *Attorney, Agent, or Firm*—Bingham McCutchen

(57) ABSTRACT

A platform for converting a signal between optical and electrical form and vice versa is provided. The platform includes a dielectric mount, a semiconductor light source and optical fibers. Some of these components are fabricated separately and then brought together in an integrated assembly together with a focusing lens. The platform permits the self-alignment of the optical fibers in a flip-chip vertical cavity surface emitting laser (VCSEL) array module package. The self-alignment of the optical fibers is achieved by the engineering of the geometrical dimensions of the platform. The techniques may be used to form large-scale integrated opto-electronic circuits and switching networks.

12 Claims, 17 Drawing Sheets

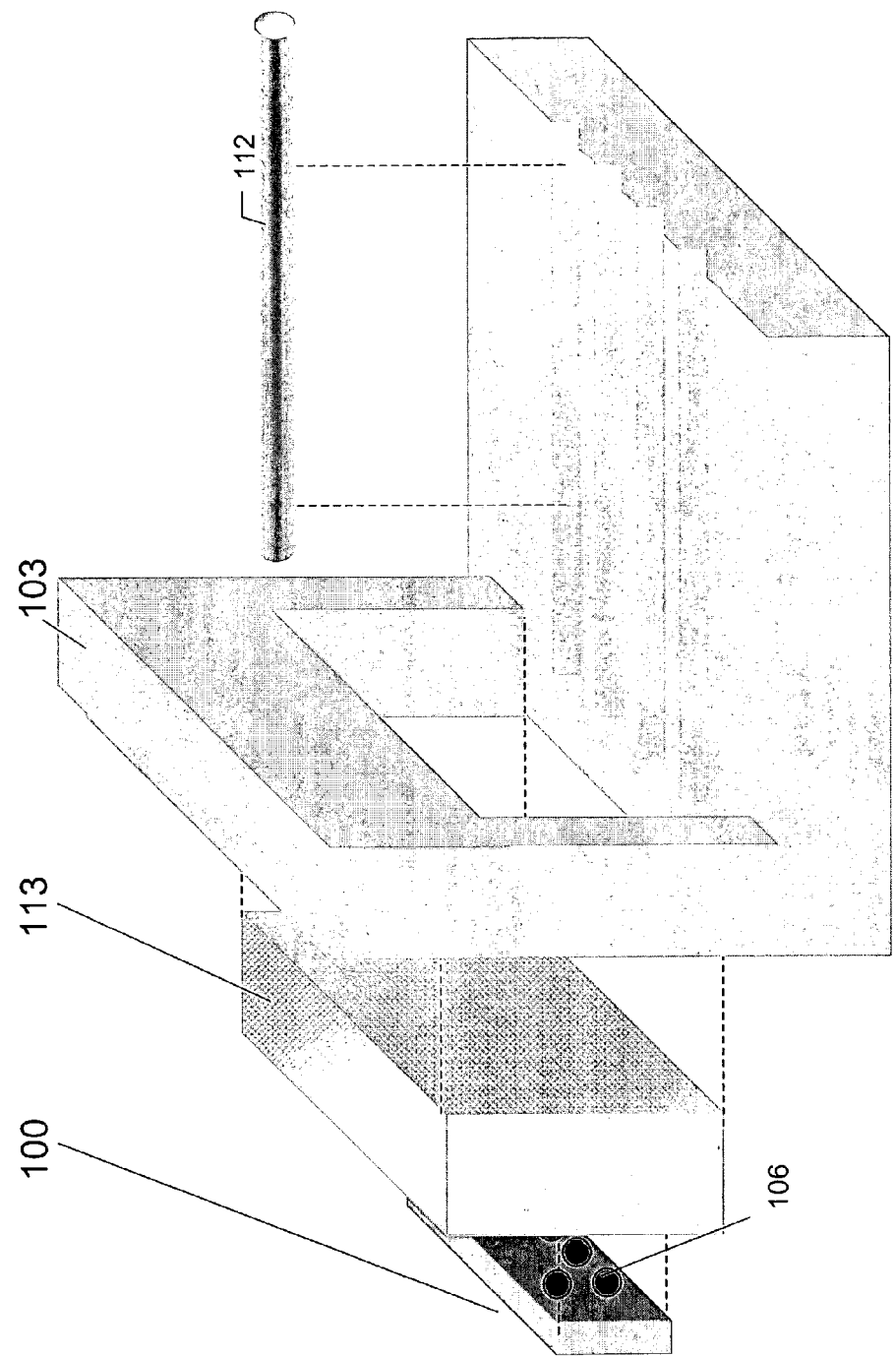

INTEGRATED PLATFORM FOR PASSIVE OPTICAL ALIGNMENT OF SEMICONDUCTOR DEVICE WITH OPTICAL FIBER

CROSS-REFERENCE TO RELATED APPLICATION

This application claims priority to provisional patent application No. 60/363,880 filed Mar. 14, 2002.

FIELD OF THE INVENTION

The present invention relates to packaging opto-electronic components and, more particularly, to an integrated platform for facilitating the physical and optical coupling of light transmitting and receiving devices to optical fibers.

BACKGROUND OF THE INVENTION

Optical fiber technology is well suited for communications applications because optical fibers have a wide transmission bandwidth and relatively low attenuation. However, optical fiber interfaces to electronic and optical networks are expensive to manufacture because of the difficulty associated with mounting laser transmitting and receiving devices onto substrates and aligning them with separately mounted optical fibers. For this reason, optical fiber technology has been widely implemented in long haul communication systems where the interfaces are relatively few. Long haul communications systems are also relatively price insensitive. However, the high cost of manufacturing fiber optic interfaces has been a barrier that has slowed the penetration of fiber optic technology into local metropolitan area communication systems and other markets.

To appreciate the coupling and alignment difficulties associated with coupling lasers to optical fibers, one must consider the geometry and dimensions of optical fibers, optical packages and laser transmitting and receiving devices. An optical fiber is an extruded, typically glass, strand that has a central core for carrying light and a surrounding cladding that facilitates internal reflection of light back into the core. During use, light is transmitted into the core of one end of the optical fiber at an acceptable angle. The incident light then travels down the fiber core to the other end of the fiber.

A typical single mode optical fiber has a core diameter of approximately 9 microns while a multi-mode fiber has a core diameter of approximately 50 or 62.5 microns. Because of the small dimensions of optical fiber cores, aligning optical fibers with laser transmitting and receiving devices, which have aperture sizes that vary from approximately 2 to 10 microns, is difficult. The problem is particularly acute when devices are aligned with single mode fibers because of their small core diameter.

There are two techniques for aligning optical fibers and devices on a package or platform: passive alignment and active alignment. Active alignment is performed by activating a light emitting device, bringing the optical fiber into position for mounting on the package, and selecting the location for mounting when the amount of light being coupled into the optical fiber (or photo-detector of the device) exceeds a given threshold. By contrast, passive alignment is performed based on the geometry of the components for assembly, without active use of a laser in the alignment process. Accordingly, passive alignment relies on placement accuracy and acceptable manufacturing tolerances to produce a reliable and repeatable assembly process.

Passive alignment based on a single integrated optical platform has been somewhat successful for multi-mode fiber coupling. This is because of the relatively large core diameter of multi-mode fibers. However, improved alignment techniques are required. In contrast, passive alignment of single mode fibers has been elusive. This is because of the tight tolerances and limitations required to optically couple a laser beam between the aperture of a laser transmitting or receiving device and the small core of a single mode fiber. The problem is exacerbated by the use of inexpensive though desirable materials for the platform, which may inherently have manufacturing tolerances that are difficult to control.

A typical method for mounting semiconductor devices onto optical platforms uses flip-chip bonding techniques, which are adapted from well-established technology from the electronics industry. Without modification, the tolerance offered by flip chip bonding of approximately 1 micron does not meet the required tolerance of 0.5 microns required for coupling an optical beam from a mounted device into a single-mode fiber.

Conventionally, a silicon platform (or package) has been used to mount a laser transmitting or receiving device and optical fibers. The platform has included a flat, slanted reflective surface of silicon that directs a laser beam between the device and a fiber. The fiber has been anchored on a v-shaped groove etched into the same silicon substrate so that the entire package is compact. This design is known as the silicon optical bench. Recently, a v-groove has been used for fiber array attachment with a vertical cavity surface emitting laser (VCSEL) device attached on a separate quartz plate.

The flat, slanted reflecting surface of these designs has several fundamental drawbacks, including: (i) the limited working distance defined as the distance between the device and the optical fiber; (ii) the failure to compensate the beam profile in the case of diode laser coupling; and (iii) high aggregate placement tolerances between the opto-electronic device and the fiber.

In order to achieve high coupling efficiency, the working distance between the opto-electronics device and the optical fiber should be kept to a minimum commensurate with geometry and other practical construction considerations. For instance, the optimum distance can be achieved by direct butt coupling of the fiber with the active region of the semiconductor device resting on a particular platform. However, this coupling scheme may not always be possible, as it is often limited by physical constraints. These issues greatly reduce or prohibit the use of this platform for the single-mode or multi-mode laser packaging using semiconductor diode lasers. Where the laser and fiber are mounted on separate platforms, active alignment is required.

Silicon v-grooves for receiving optical fibers have been conventionally formed by chemically etching precise shapes in the crystalline structure of silicon. However, single crystal silicon is very expensive, compared to glass and plastics. Polymer molding technology has been used to design a waveguide having a lens system, a 45 degree reflection prism and ferrule bore. Other waveguides have used plastic injection molding to produce a complex optical multiplexer integrated with a filter block, a 45 degree reflection prism, a lens system and fiber ferrule core. However, these waveguides have not conventionally provided a sitting platform for a laser transmitting or receiving device. Thus, active alignment has been needed to place and align the separately packaged device with the waveguide, which is labor intensive and costly. Still other modular platforms have been deployed that have several pieces requiring active alignment.

Unlike the batch packaging processes that are efficiently used for some electronics chips, the packaging of optoelectronics components using active alignment techniques has to be done one-by-one. This adds to the cost of the assembly. To a lesser degree, the handling of many small mechanical components of hundreds of micrometers to a few millimeters in size and the sealing in a hermetic environment also adds to the cost of packaging.

High cost has never been a major issue in long haul communications as these components are used and shared by many users. However, the emergence of the short reach metro/access markets, which is the next growth area in photonics, increases the need for low-cost packaging because these markets are extremely price-sensitive. The high-volume, low-cost demand must be met with significant improvement in manufacturing economics. The way to lower packaging cost is the use of more integration of photonic components in a single platform, passive alignment techniques, batch manufacturing, and the introduction of more automation in manufacturing.

Accordingly, there is a need for a new technique for mounting and aligning light transmitting and receiving devices with optical fibers that permits low-cost passive alignment techniques to be used. There is a further need for a single, integrated platform to be used for mounting laser transmitting and receiving devices and optical fibers. There is still a further need for a platform and mounting method that uses techniques to relax manufacturing tolerances and that allows the use of inexpensive materials for the mounting platform, such as plastic or glass.

SUMMARY OF THE INVENTION

According to one embodiment of the invention, a single platform is provided that reduces alignment tolerances through its integrated features. These features include a mirror to deflect a light beam from an attached source transmitter toward an optical fiber, an integrated focusing lens between the mirror and the fiber with an effective demagnification image at the fiber, and a v-shaped groove structure for receiving the optical fiber in the same platform. The platform may be manufactured inexpensively, such as by transfer/injection molding, grinding or polishing of glass and plastic material, depending on the particular application. The same principles may be applied where photo-detectors are used for receiving the light beam instead of transmitting the light beam.

In general, the light beam may be produced by a laser, such as a vertical cavity surface emitting laser (VCSEL) or other laser. In addition, the light beam may be a non-laser, such as a semiconductor optical amplifier (SOA) or any other beam. The mirror may be set to deflect the beam at a 45 degree angle, or any other suitable angle, toward the optical fiber core.

According to another embodiment of the invention, the flat mirror and lens may be replaced with an integrated concave mirror with a similar focusing and demagnification effect. Because of the relaxed tolerances resulting from the focusing and demagnification of the beam, the use of passive alignment techniques, such as flip-chip bonding, may be applied. The platforms and mounting methods are suitable for both multi-mode and single-mode fiber.

According to the present invention, 1) the working distances between the platform and optical fiber are extended; 2) the beam profile is adjusted into symmetrical form by a focusing lens; and 3) the tolerances for passive alignment are relaxed in x and y dimensions as compared to conventional techniques. These features reduce the cost of manufacturing optical packages.

According to another embodiment of the present invention, the platform is a dielectric substrate made of glass, plastics such as polymethylmethacrylate (PMMA) or polycarbonate (PC), or other suitable materials. A vertical cavity surface emitting laser (VCSEL) unit is mounted using flip-chip bonding to the substrate. Total reflection of the laser is realized on the surface of the angled sidewall of the substrate. The angle of the sidewall may chosen to deflect the beam at a ninety degree angle or any other convenient angle between 0 and 180 degrees. Through the integrated lens of the platform, light is focused at the image plane, at which distance the optical fibers are placed in, for example, V-grooves or ferrules.

BRIEF DESCRIPTION OF THE DRAWINGS

The following detailed description, given by way example and not intended to limit the invention solely to the embodiments described herein, will best be understood with reference to the accompanying drawings in which:

FIG. 4A depicts a three dimensional view of an integrated platform where the fiber array is normal to a beam generated by the emitting surface of, for example, a VCSEL device.

DETAILED DESCRIPTION

According to one embodiment of the invention, a single platform is provided that reduces alignment tolerances through its integrated features. These features include a 45-degree mirror to deflect a laser beam from a vertical cavity surface emitting laser (VCSEL) transmitter toward an optical fiber, a focusing lens between the mirror and the fiber with an effective demagnification image at the fiber, and a v-shaped groove structure for receiving the optical fiber in the same platform. The platform may be manufactured inexpensively, such as by transfer/injection molding, grinding or polishing of glass and plastic material, depending on the particular application. The same principles may be applied where photodetectors are used for receiving the laser instead of transmitting the laser.

Figure 1A:
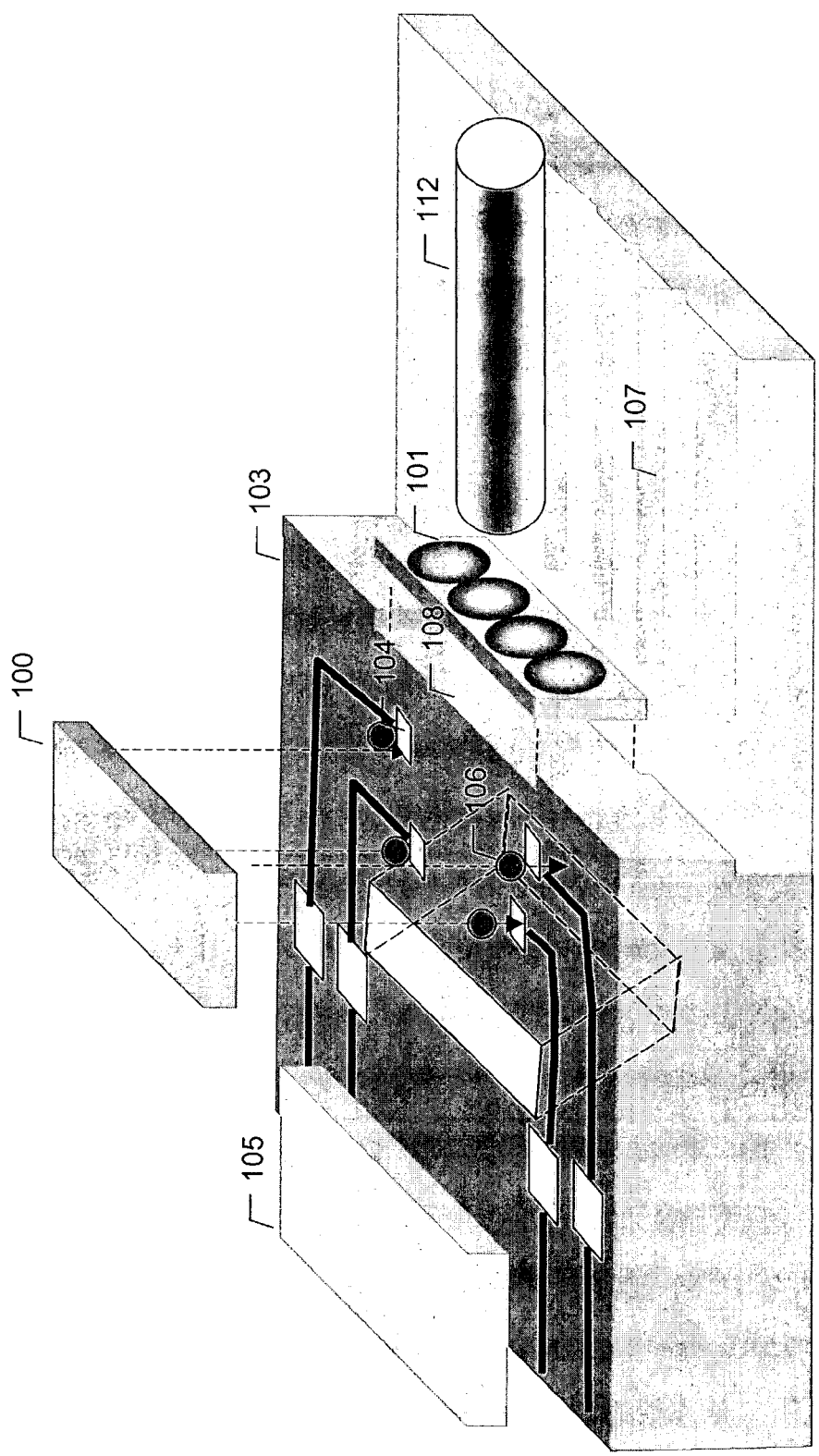
FIG. 1A is a three dimensional view of an integrated platform according to an embodiment of the present invention showing pads and interconnections for electrically and optically coupling a VCSEL device to an optical fiber via the platform.

FIG. 1A depicts a three dimensional view of an integrated platform according to an embodiment of the present invention showing pads and interconnections for electrically and optically coupling a light transmitting or receiving device 100, such as a VCSEL device, to an optical fiber 109 via the platform. Referring to FIG. 1A, a dielectric substrate 103, is used to mount a laser transmitting or receiving device 100 and an optical fiber. The substrate 103 may be made of glass or other suitable material such as a polymer. The substrate 103 may be formed by transfer molding, injection molding or high precision grinding. When glass molding is used, pre-shaped glass may be pressed into a mold that is pre-heated. After few minutes, the pressure may be released and the substrate taken out. There is a wide range of temperatures, depending on the glass transition temperature of the material used, that may be used during the molding process. For example, a temperature range of 650 degrees to 1300 degrees depending on the glass materials used is common. However, temperatures outside of this range are also possible. When polymers are used, injection molding processes may be used to form the substrate.

The substrate 103 includes a device mounting surface onto which electrical interconnections may be formed for mounting opto-electronic devices. For example, bonding pads 104 may be formed on the substrate 103 that are aligned with mating bonding pads on the device 100. Similarly, wiring may be formed on the device mounting surface or in the device mounting surface to couple the bonding contact pads to other devices on the substrate, such as the laser driver device 105 or other devices external to the substrate 103 via, for example, wire bonding.

In order to manufacture the bonding pads 104, a metal may be deposited onto the substrate 103 in predetermined locations. The deposition may be performed using any of several well known techniques for depositing metal onto a substrate. According to one embodiment, layers of pure gold are deposited on the substrate 103 to produce the bonding contact pads 104. The device 100 may comprise a semiconductor laser source such as a VCSEL device or VCSEL array. The devices 100 and 105 may be mounted using solder balls 106. According to one embodiment of the invention, the solder balls 106 may comprise a eutectic mixture of gold/tin solder balls which range in size from, for example, five to fifty microns. The devices 100 and 105 may be interconnected and/or connected to devices off of the substrate by wire-bonding using, for example, pure gold. It will be understood that other materials may be used for forming solder balls and wire bonds.

The substrate 103 may include a fiber mounting portion that includes a fiber mounting surface that extends away from the device mounting surface. The fiber mounting surface may include v-shaped grooves 107 for receiving optical fibers. The v-shaped grooves 107 may be precisely formed as part of the molding process. Alternatively, they may be machined into the fiber mounting surface. The v-shaped grooves 107 provide a mechanism for precisely defining the mounting point for each optical fiber that is to be coupled to the device 100 on the substrate.

The substrate 103 also includes a reflective, slanted side wall beneath the device 100 and the device mounting surface. The substrate 103 is translucent so that a laser emitted from (or coupled to) the device 100 passes through the substrate. When the device 100 includes a VCSEL, the laser beam is transmitted from a laser on the device down through the substrate. The slanted reflective side wall is angled to reflect the beam from the device 100 toward the v-shaped groove associated with the active VCSEL. The reflective side wall may present, for example, a 45 degree angle between the side wall and the mounting surface. Other angles between 0 and 90 degrees are possible depending on the geometry of the substrate, characteristics of any lenses provided in the substrate and the characteristics of the device 100. In general, the angle of the reflective side wall should be selected to provide maximum coupling of the laser beam between the optical fiber and the device 100.

The substrate 103 also includes a transmission face through which a laser beam from the device 100 or from an optical fiber travel. In the transmission face, a recess may be formed. A lens mounting stage 108 may be formed with one or more focusing lenses in it. The lens mounting stage 108 may be assembled within the recess of the substrate by, for example, adhering the mounting stage to the substrate within the recess. For adhering the lens array 101 to the transmission face, an index-matching epoxy may be used. Alternatively, the lenses may be integrally formed in the transmission face of the substrate.

In the v-shaped grooves 107, optical fibers 109 are aligned at the image plane of each focusing lens. This may be performed using a guiding stopper. The substrate shown in FIG. 1A has the potential to extend the working distance between the reflective plane and the optical fibers and achieve high coupling efficiency with larger alignment tolerances. This is due in part to the demagnification afforded by the lens array 101.

Figure 1B:
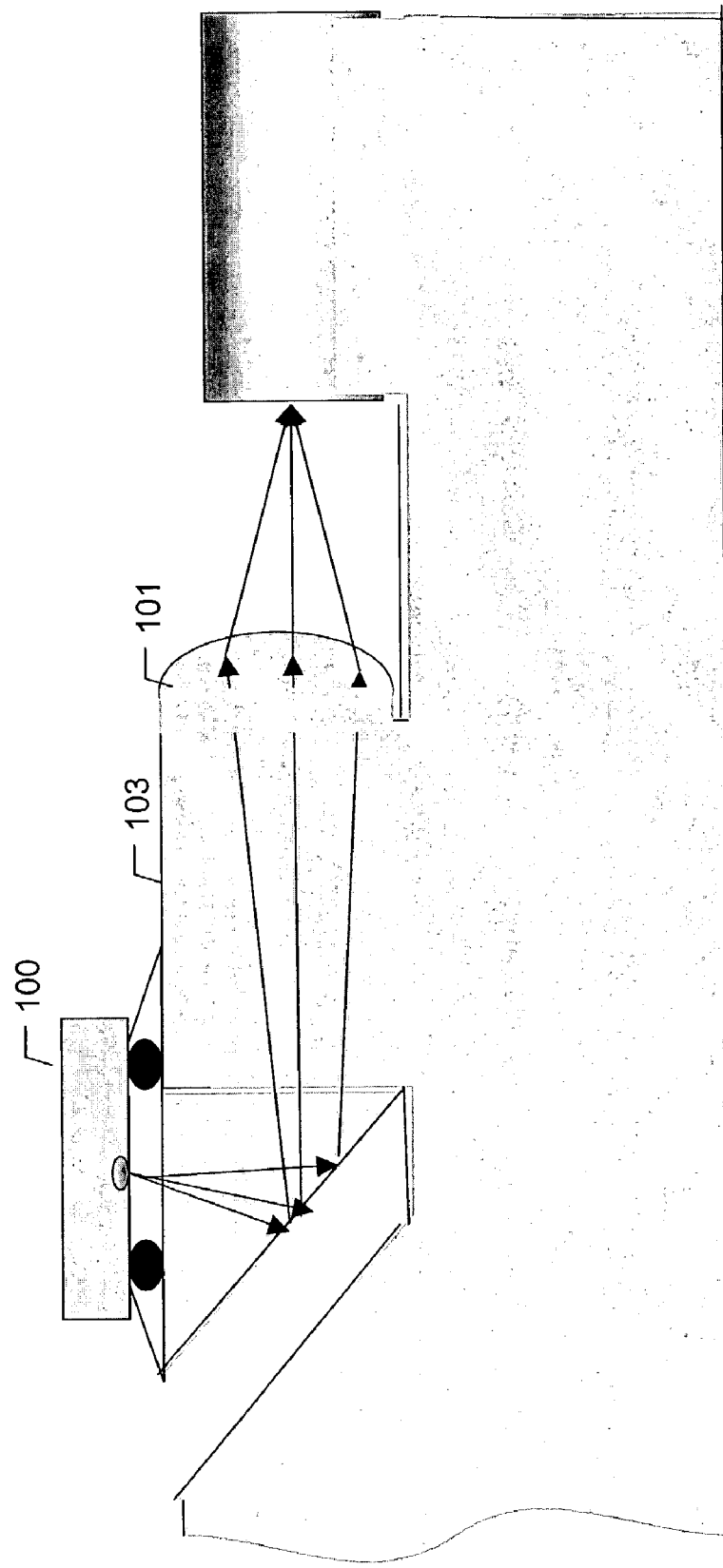
FIG. 1B shows a cross section of FIG. 1A which illustrates the propagation of a laser beam from a VCSEL device through the platform to an optical fiber through a focusing lens.

FIG. 1B shows a cross section of FIG. 1A which illustrates the propagation of a laser beam from a VCSEL device 100 through the platform 103 to an optical fiber through one of the focusing lenses in the lens array 101. Referring to FIG. 1B, a laser beam is emitted from the VCSEL and travels through the substrate 103 toward the reflecting surface. The reflecting surface reflects the beam toward the lens in the transmission face of the substrate 103. The beam becomes wider as it travels from the reflecting surface to the lens. The lens focuses and concentrates the beam into a narrower profile that should be centered in the core of the end face of the optical fiber. This focusing extends the working distance and increases the coupling efficiency of coupling the beam into the fiber core.

Figure 1C:
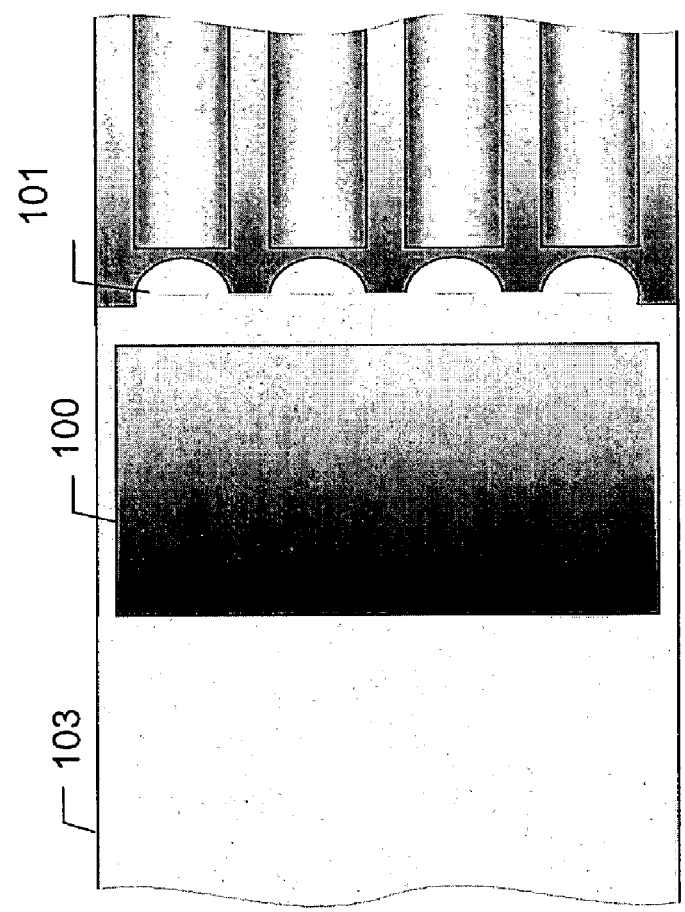
FIG. 1C shows a top view of the FIG. 1A embodiment.

FIG. 1C shows a top view of the FIG. 1A embodiment. It is apparent from FIG. 1C that the device 100 is positioned over the slanted, reflective surface and that the lens array 101 is positioned between the ends of the optical fibers and the slanted, reflective surface. It is also apparent that there may be a gap between the fiber ends and the lenses.

Figure 1D:
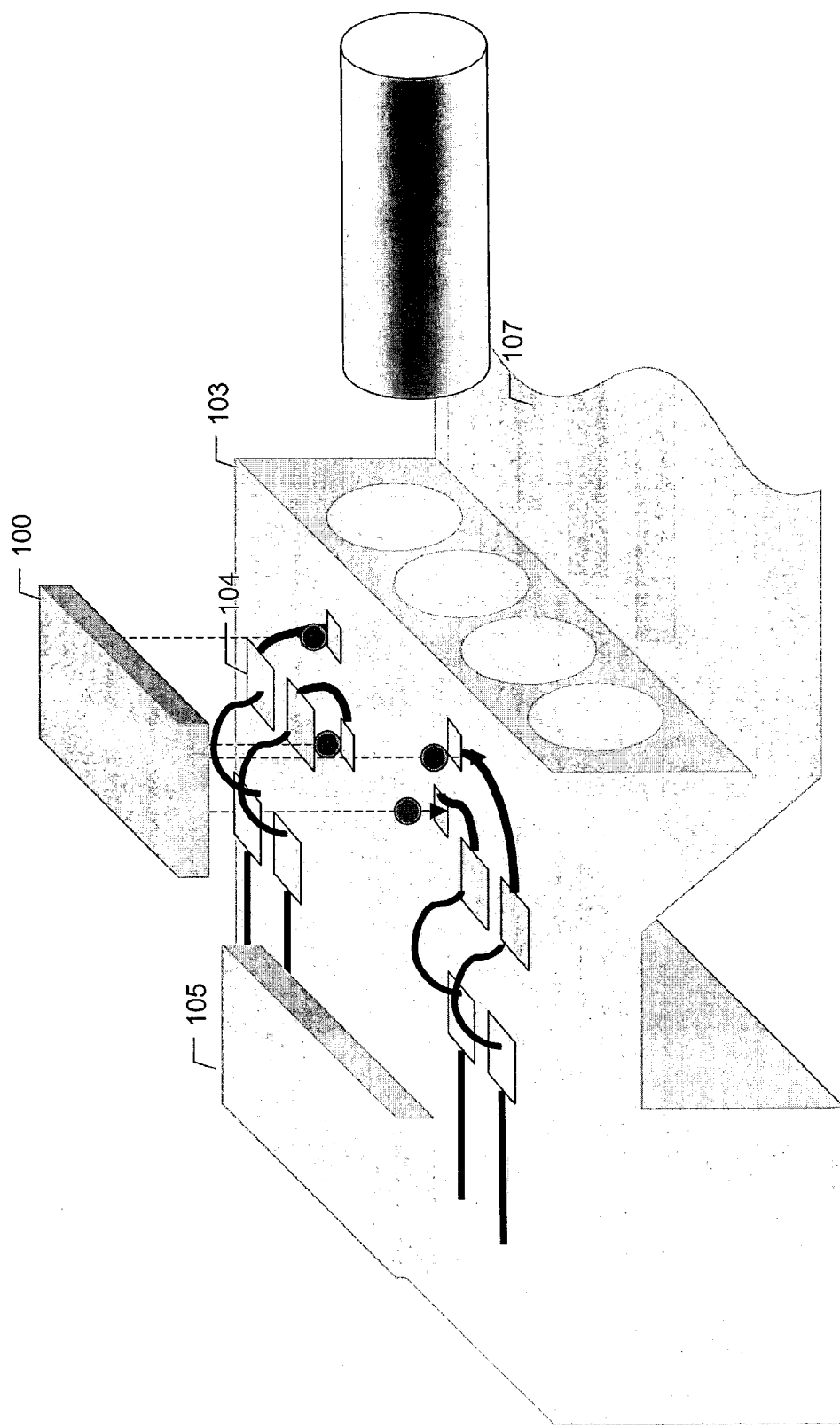
FIG. 1D is a three dimensional view of an integrated platform according to an embodiment of the present invention, showing the pads and interconnections.

FIG. 1D is a three dimensional view of an integrated platform according to an embodiment of the present invention, showing the pads and interconnections. Referring to FIG. 1D, the slanted, reflective surface of the substrate 103 is formed as part of a surface opposite the device mounting surface. This design may be less rigid than that shown in FIG. 1A, where the slanted, reflective surface is formed within the substrate 103 by a cutout that extends to the device mounting surface. FIG. 1D also shows an embodiment in which the lens array is integrally formed into the transmission face of the substrate 103. In addition, the surface metallization of the device mounting surface for the substrate shown in FIG. 1D is slightly different than in FIG. 1A and leverages wire bonding to external devices.

Figure 1E:
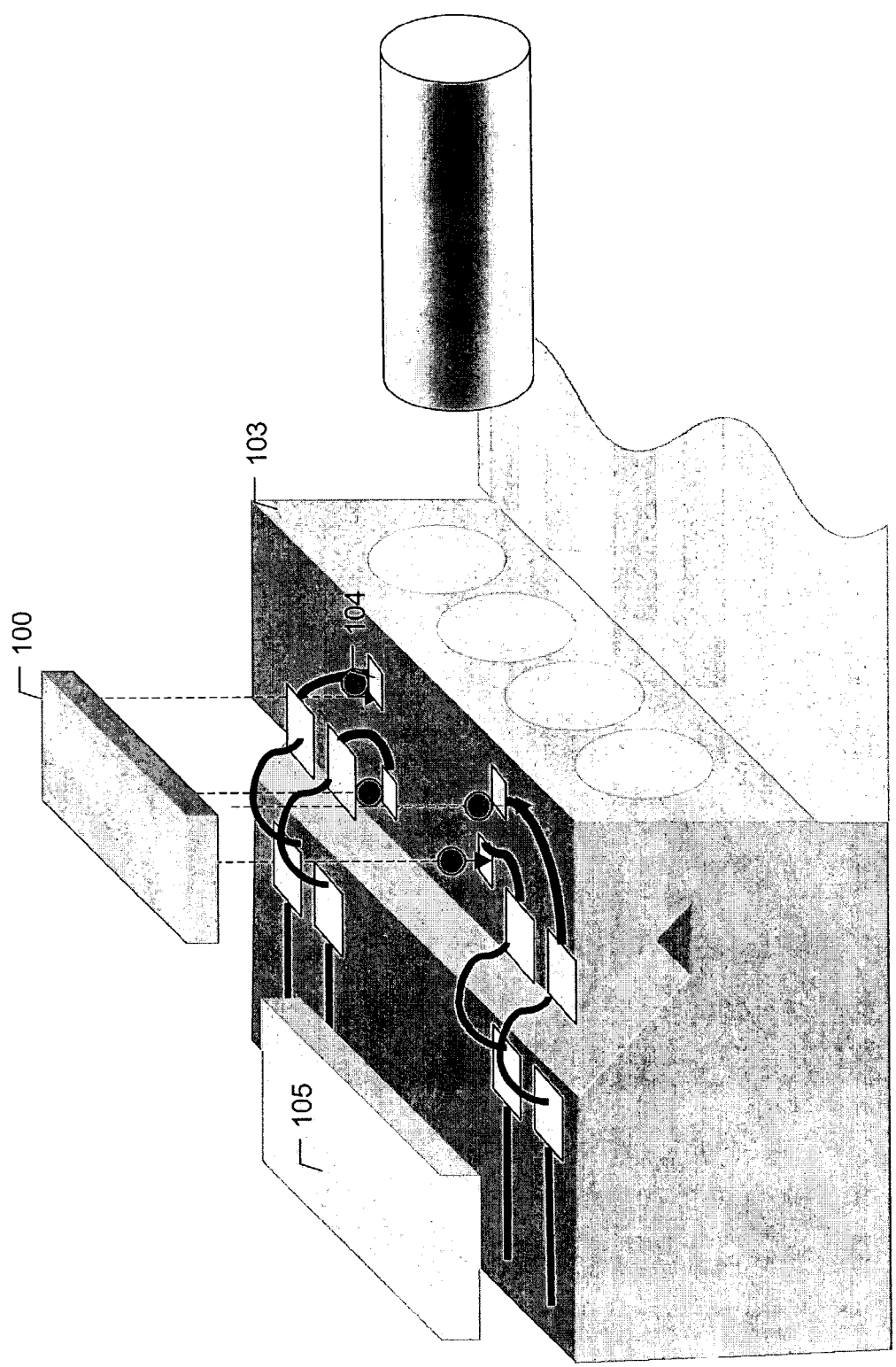
FIG. 1E is a three dimensional view of an integrated platform according to an embodiment using a one-piece integrated substrate having integral lenses.

FIG. 1E depicts a three dimensional view of an integrated platform according to an embodiment using a one-piece integrated substrate having integral lenses. Referring to FIG. 1E, one substrate integrates a 45° mirror, micro-lenses formed in the transmission face of the substrate and v-shaped grooves formed in a fiber mounting surface, formed by transfer molding. The 45° of the mirror refers to its angle relative to the device mounting surface. A 45° angle produces a beam reflection of 90°. Any suitable beam reflection angle between 0 and 180 degrees may be used depending upon the implementation in order to redirect a beam between a fiber optic core and the light emitting or receiving device.

The molding material may be glass or other high-temp polymers. This substrate can also function as a carrier for the laser driver and other electronics. Layers of pure gold may then be deposited to produce the bonding contact pads 104, to which the semiconductor laser source 100 (VCSEL array) and the laser driver 105 devices are mounted using a eutectic mixture of gold/tin solder balls (20 µm diameter) 106. These components are then interconnected by wire-bonding using pure gold. Similar to FIG. 1A embodiment, the laser beams emitted from VCSELs are reflected by the 45° mirrors, then focused by the micro-lens into optical fibers sitting on the v-shaped grooves.

Figure 1F:
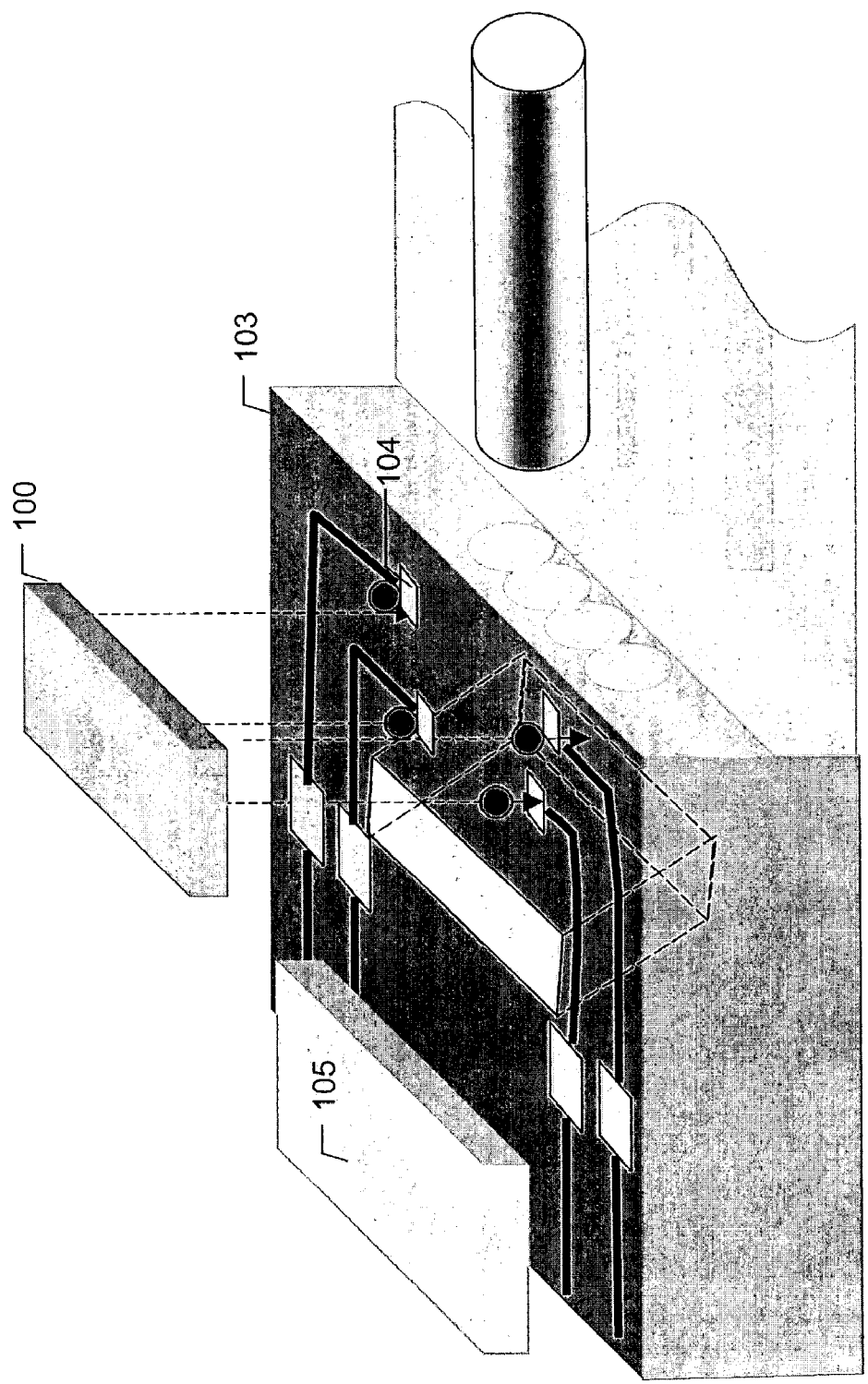
FIG. 1F is a three dimensional view of an integrated platform according to an embodiment using a one-piece integrated substrate.

FIG. 1F is a three dimensional view of an integrated platform according to an embodiment using a one-piece integrated substrate. Referring to FIG. 1F, the substrate 103 includes a 45° reflective plane embedded inside the substrate. This substrate has a stronger mechanical structure, thus the design constrains relative to the position of the 45° mirrors can be relaxed. The closer the 45° mirror is to the lens, the shorter the optical path from VCSEL to the lens. The shorter the optical path from VCSEL to the lens, the less the laser beam diverges before being collected by lens. This substrate can also provide electrical paths from VCSELs to laser driver devices, eliminate the use of wire bonding, which in turn makes the whole package more robust.

Figure 1G:
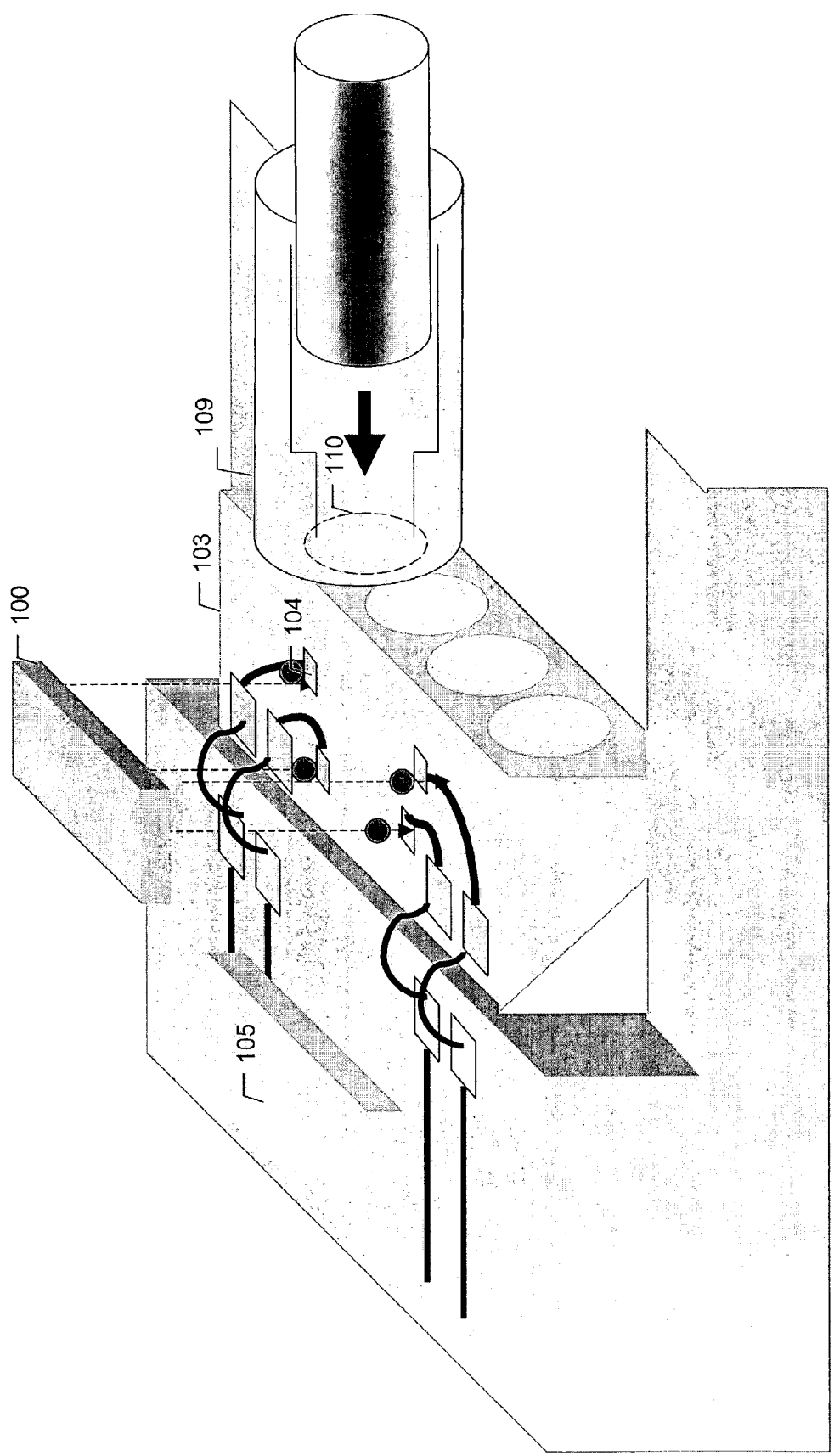
FIG. 1G shows the placements of the fibers onto the integrated platform via ferrules according to an embodiment of the present invention, where two platforms are glued together within a system.

FIG. 1G shows the placements of the fibers onto the integrated platform via ferrules according to an embodiment of the present invention, where two platforms are glued together within a system. Referring to FIG. 1G, a ferrule 109 is used for the alignment of the optical fibers. The ferrules are designed to have a fitting end to anchor on the curve surface of substrate 103. The fibers are then placed through the ferrules at the image plane. This may be controlled by using guiding stopper 110. Also in FIG. 1G, it is apparent that the substrate 103 may be coupled to another packaging component, which may include an integrate circuit board. The device 100 may be driven from other devices on the printed circuit board that are wire bonded to the device 100.

Figure 1H:
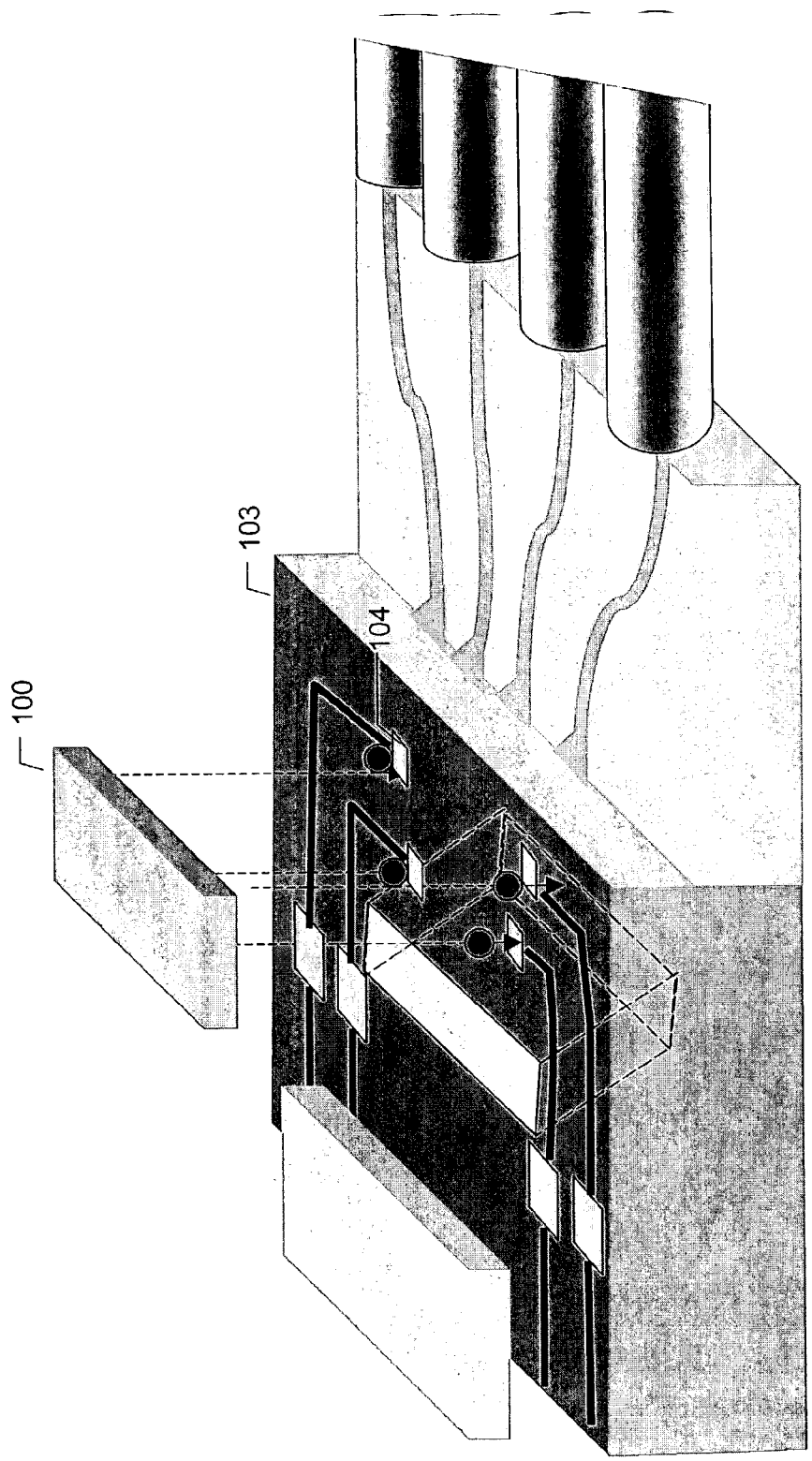
FIG. 1H shows an integrated platform according to an embodiment of the present invention in which an arrayed wave guide is substituted for the lens-v-groove-fiber combination.

FIG. 1H shows an integrated platform according to an embodiment of the present invention in which an arrayed wave-guide is substituted for the lens-v-groove-fiber combination. Referring to FIG. 1H, an arrayed waveguide is substituted for the lens-v-groove-fiber combination in the FIG. 1A embodiment. According to this embodiment, a laser beam emanates from a VCSEL device, reflects off of the slanted surface and enters the wave-guides. Each wave-guide in turn conveys the beam to the respective optical fiber. The wave-guides may be monolithically integrated with the platform or may be separately manufactured and combined with the platform to form a hybrid structure.

Figure 1I:
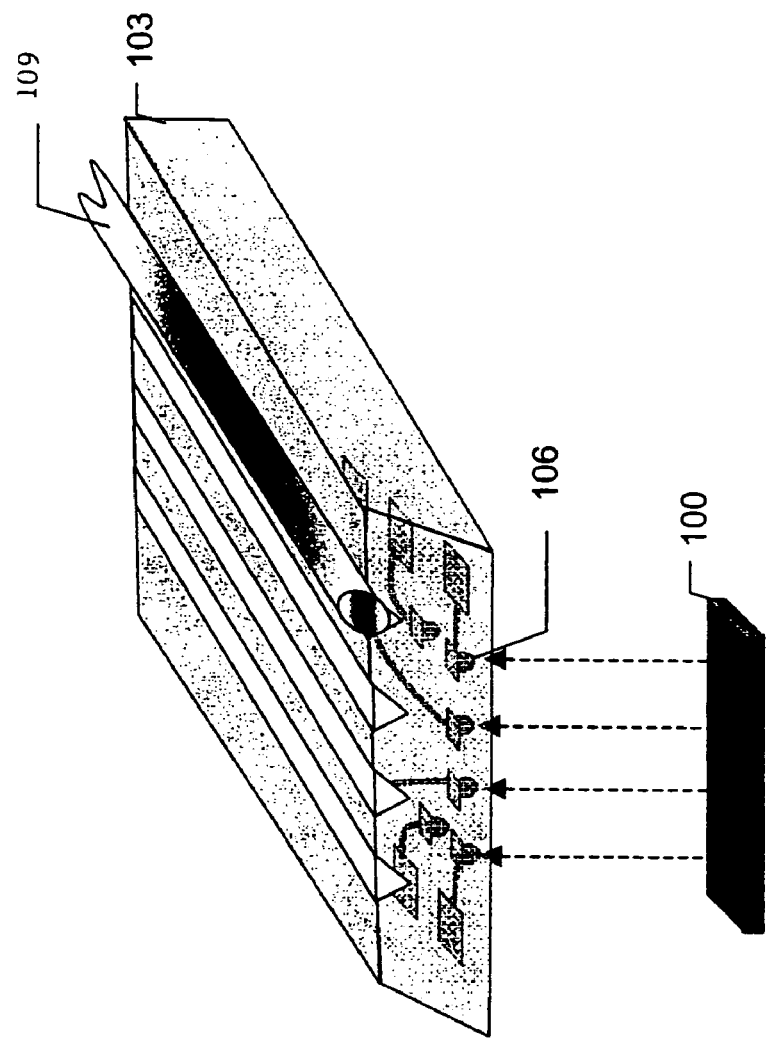
FIG. 1I depicts a three dimensional view of an integrated platform according to an embodiment of the present invention in which the fiber incorporates a reflective angled surface.

FIG. 1I depicts a three dimensional view of an integrated platform according to an embodiment of the present invention. The platform material must be transparent to permit transmission of a beam of light. The material may be glass or plastic which is transparent. If necessary, the platform material may desirably be high-temperature resistant to allow subsequent manufacturing steps to be performed at high temperatures.

Referring to FIG. 1I, the platform 103 includes an upper surface with V-grooves and a lower surface for receiving a light emitting or receiving component. The lower surface also may include metallization on the lower surface, including solder balls 106, for connecting to and mounting the light emitting or receiving component 100. Fibers 112 may be mounted within the V-grooves on the platform and in this manner are aligned relative to the substrate. One end of the fiber is polished into a certain angle relative to the fiber and substrate and coated to provide a reflective surface at the fiber—surface interface. The fiber 112 is positioned at a point along the V-groove so that a beam of light reflected from the reflective surface of the fiber with travel between the beam emitting or receiving device within the component 100, such as a VCSEL, and the fiber core. In other words, the component 100 and fibers 112 are aligned based on the angle of the reflective surface relative to the fibers and/or the platform, the platform geometry and the geometry of the VCSEL array with the associated windows of each VCSEL device. The angle of the reflective surface of the fiber 112 may be any convenient value and may vary among different fibers 112 within the V-grooves if desired.

Figure 1L:
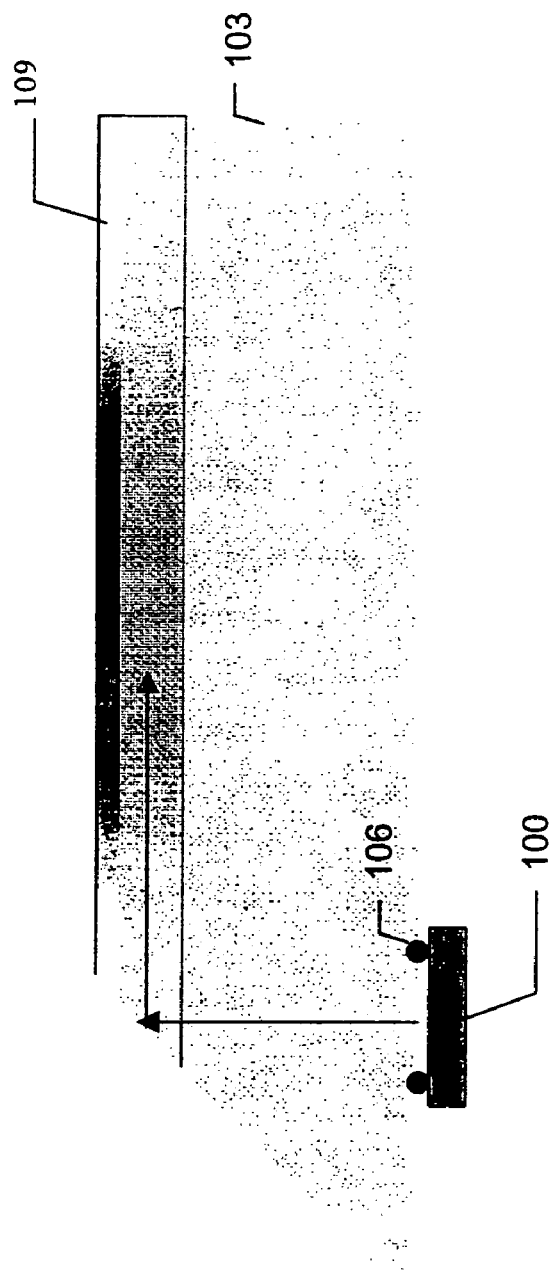
FIG. 1L shows a cross section view of FIG. 1I taken through the fiber and the platform along the fiber.

FIG. 1L shows the cross section view of the FIG. 1I embodiment in which the light path of a beam of light transmitted from the component 100 to the fiber 112 is shown. Referring to FIG. 1L, the beam traverses the translucent platform 103, the V-groove and penetrates an outer surface of the fiber 112. For this reason, the portion of the fiber that is in the path of the beam must have a translucent surface permitting entry of the light beam into the fiber 112. Once in the fiber, the beam traverses the fiber, reflects off of the reflective surface and travels down the fiber core. After passing through the glass substrate and the fiber cladding, the light beams from VCSEL array are reflected by the angled fiber core, then propagate along the fiber array.

Figure 2A:
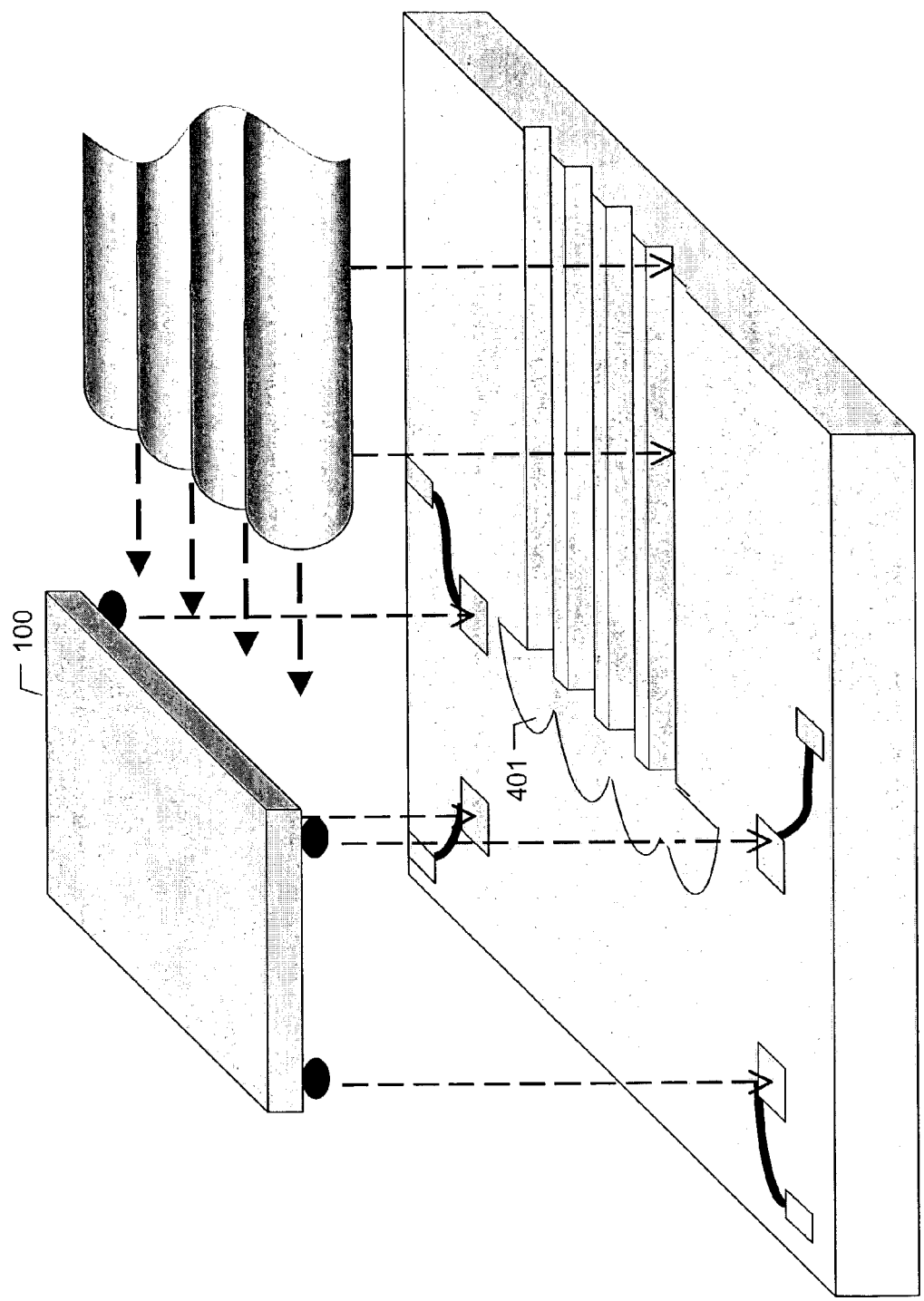
FIG. 2A is a three dimensional view of an integrated platform according to an embodiment of the present invention which uses a curved reflecting surface for laser reflection and focusing.

FIG. 2A depicts a three dimensional view of an integrated platform according to an embodiment of the present invention which introduces a curved reflecting surface for laser reflection and focusing. Referring to FIG. 2A, the substrate comprises multiple curved surfaces 401 that each function as concave mirrors. Incident light from a VCSEL is reflected off of the curved surfaces 401 and focused on the image plane where multiple optical fibers are placed into v-shaped grooves. The concave mirror replaces the reflecting plane and the focusing lens used in the embodiments of FIG. 1. This simplifies the design into a more compact one. In order to ensure maximum reflectivity from the curve surface, a metal layer coating can be formed on this surface. This embodiment is capable of achieving high coupling efficiency with larger alignment tolerances and also allows for extending the working distance between the mirror and the fibers.

Figure 2B:
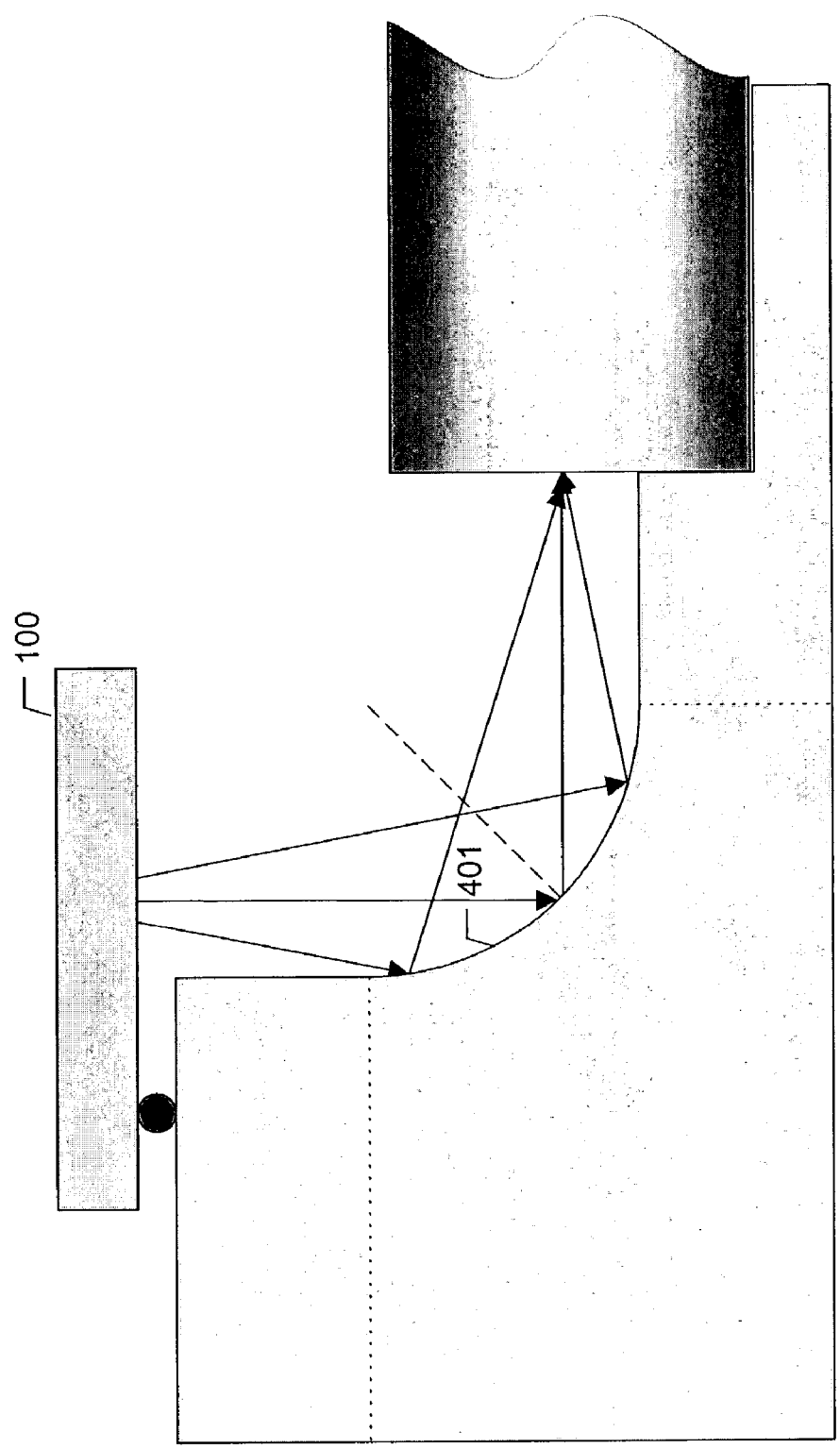
FIG. 2B shows a cross sectional view of the FIG. 2A embodiment.

FIG. 2B shows a cross sectional view of the FIG. 2A embodiment. Referring to FIG. 2B, a beam from a VCSEL is shown diverging as it travels toward the reflecting curved surfaces 401. The beam is then reflected toward the optical fiber and focused so that upon hitting the optical fiber, the beam is concentrated and enters the fiber at the core center.

Figure 2C:
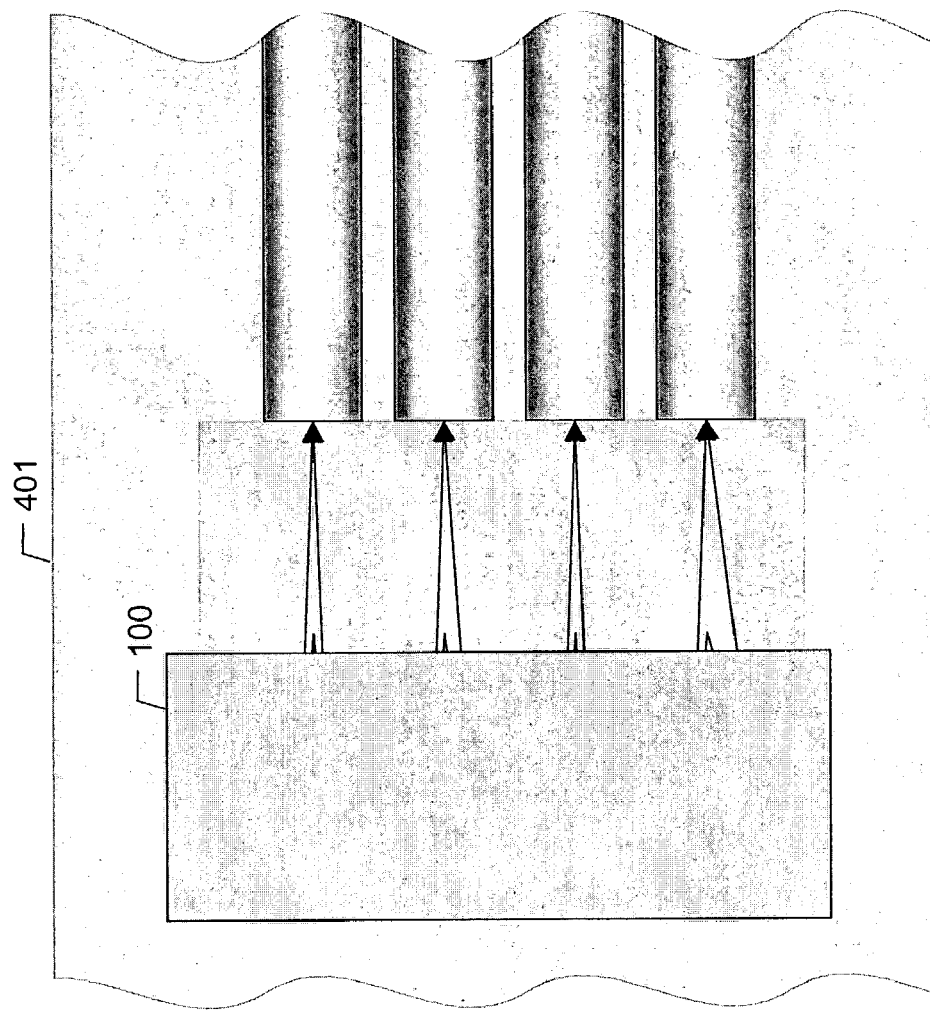
FIG. 2C shows a top view of the FIG. 2A embodiment.

FIG. 2C shows a top view of the FIG. 2A embodiment which illustrates the two way transmission feature of embodiments of the present invention. It also illustrates the use of multiple transmitters.

Figure 3:
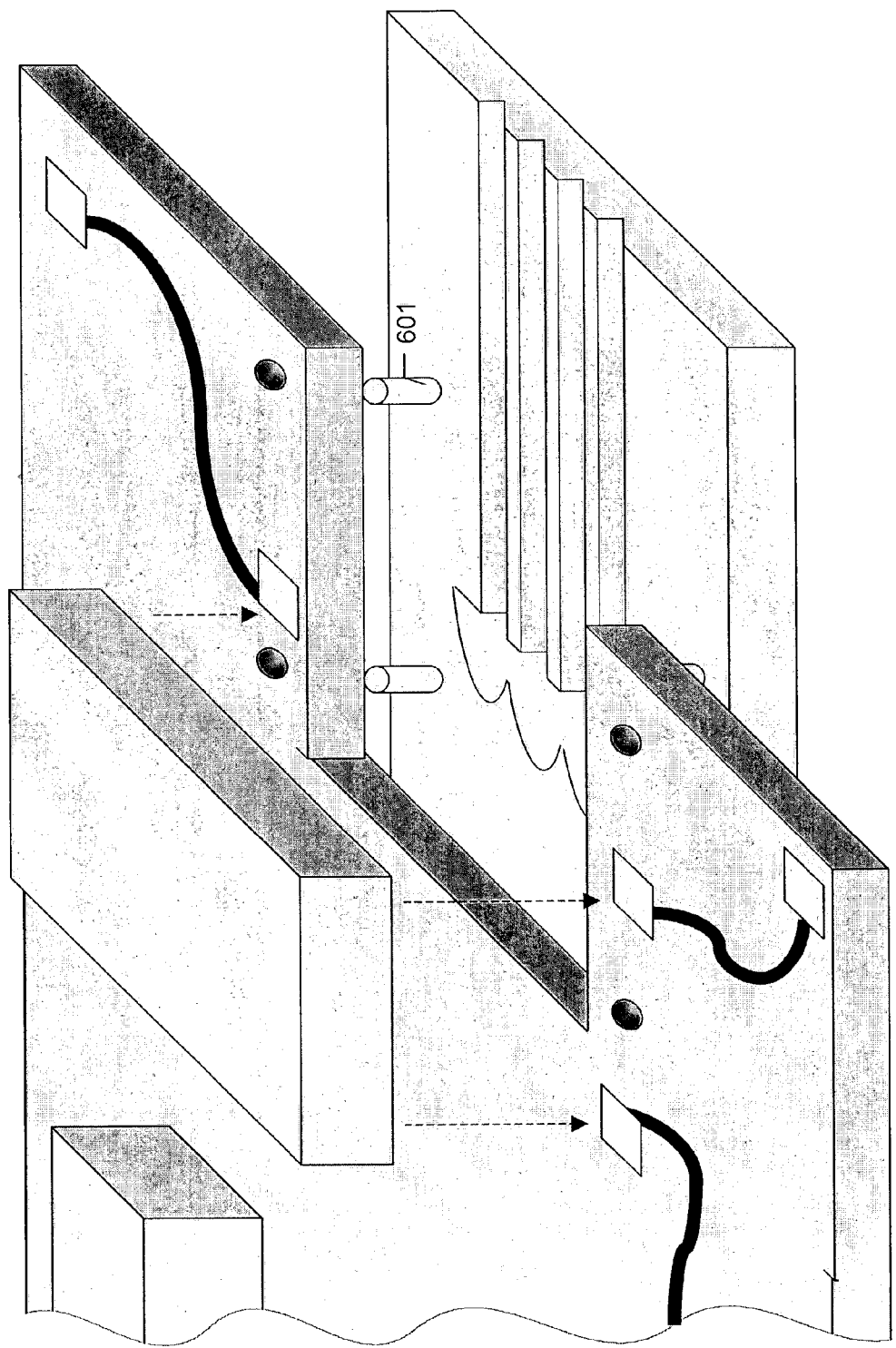
FIG. 3 is a three dimensional view of an integrated platform according to an embodiment of the present invention which is integrated onto a printed circuit board.

FIG. 3 depicts a three dimensional view of an integrated platform according to an embodiment of the present invention which is integrated onto a printed circuit board. Referring to FIG. 2A, the optical platform comprises a polymer substrate that has a curve surface for focusing a laser beam emission from the VCSEL device. In this embodiment, the semiconductor device is attached directly to an electronic printed circuit board or a platform with other electronic components through flip-chip bonding as an alternative to lead frame chip packages due to the high temperatures required for the solder bonding step. The polymer substrate is designed to have guide pins 601 for the attachment to the electronic platform together with the corresponding metal coated curve surfaces and the fibers grooves. This design has application due to the ease of assembly in the widely developed PCB industry.

Figure 4B:
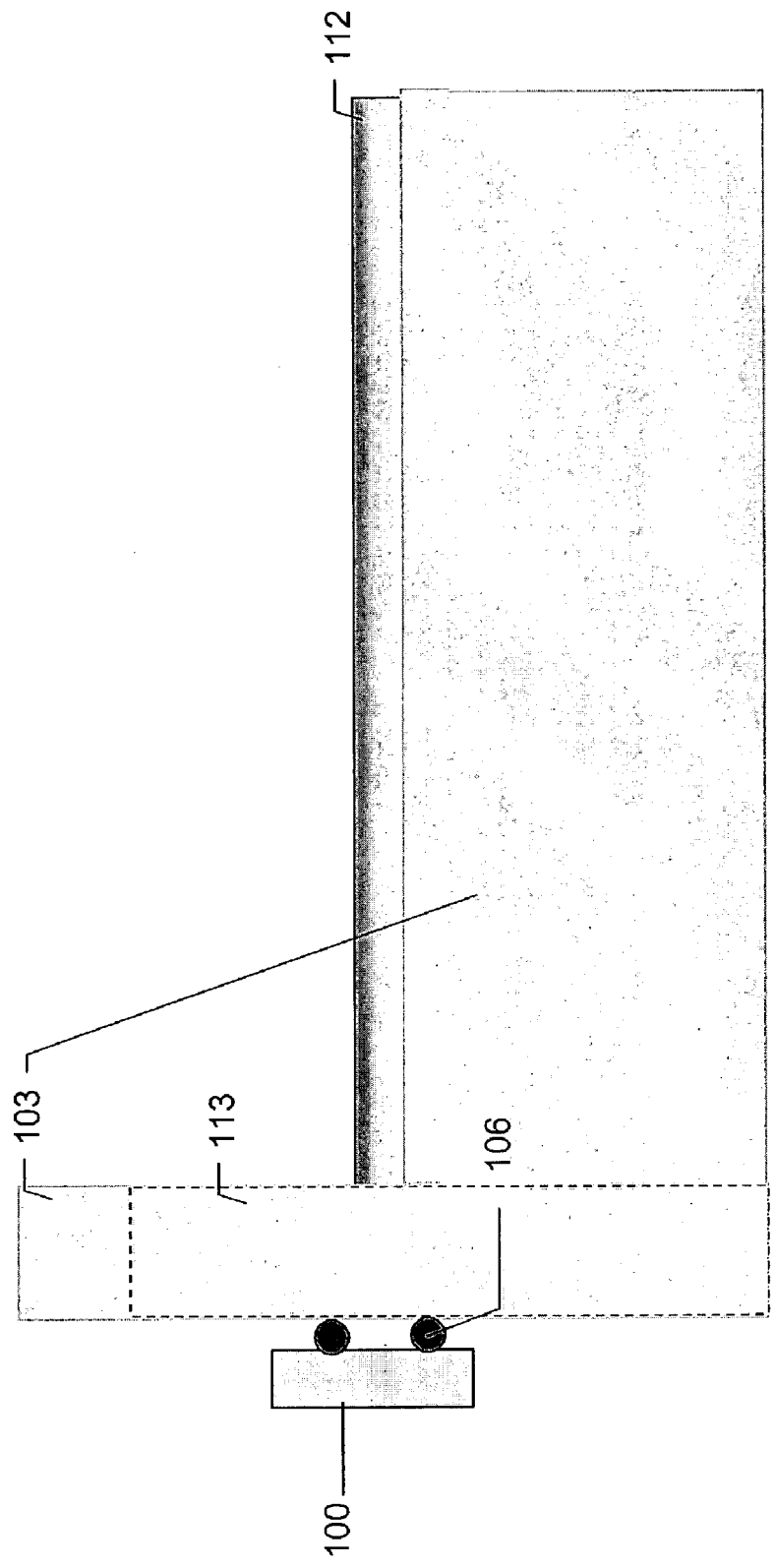
FIG. 4B shows the cross section view of the FIG. 4A in a configuration where the component and fiber are both mounted to the substrate.

As for the mounting of the semiconductor laser device, an underfill is applied to fill the gap between the laser device and the submount in order to add mechanical strength and to minimize the oxidation of the semiconductor device, bonding pads and solder pumps. FIG. 4A depicts a three dimensional view of an integrated platform where the fiber array is normal to a beam generated by the emitting surface of, for example, a VCSEL device 100. The VCSEL array may be flip-chip bonded onto a glass substrate 113 using solder balls 106. The integration platform 103 has an array of V-grooves positioned parallel to the beam when the component is aligned relative to the platform 103. The platform 103 also includes a rectangular frame for receiving and mounting the glass substrate 113. By controlling the dimensional tolerance of the integration platform and glass substrate 113, the VCSEL array can be optically aligned with the fiber array 112 passively. This may be accomplished by sizing the glass substrate to fit precisely within a rectangular cutout portion of the platform 103. Other techniques include pattern recognition if alignment marks are patterned on the glass substrate 113 and the platform 103, respectively. FIG. 4B shows the cross section view of the FIG. 4A in a configuration where the component 100 and fiber 112 are both mounted. Light beams from the VCSEL array of the component 100 pass through the glass substrate 113 and then go directly into the fiber array. The fiber may be, but is not limited to lensed fiber. The glass substrate 113 not only acts as an electrical and physical mounting surface for the component, it also acts as a fiber stopper. The fiber stopper facilitates alignment of the fiber along the V-groove by allowing alignment through butting one end of the fiber against the surface of the glass substrate 113. In such manner, the distance between the component and fiber end can be well-controlled. A beam of light emitted from the component 100 passes through the glass substrate 113 into one end of the fiber 112.

Figure 5:
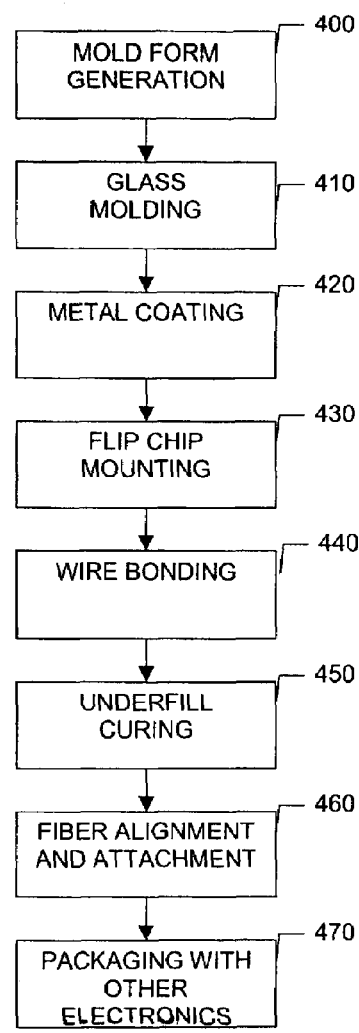
FIG. 5 depicts a method of forming an integrated platform according to an embodiment of the present invention.

FIG. 5 depicts a method of manufacturing a platform according to an embodiment of the present invention. Referring to FIG. 5, in step 400, a mold form is generated. The mold form is used to produce the substrate by, for example, either transfer molding or injection molding in step 410. In step 420, the substrate is selectively coated with metal, pursuant to a masking procedure, to form bonding pads. In step 430 devices for laser transmitting and receiving are mounted onto the bonding pads using solder or flip chip mounting techniques. In step 440, other devices and components are wire bonded to the pads formed on the mounting surface of the substrate 103. In step 440, an underfill is then applied to protect the chip from oxidation and to provide mechanical support. In step 450, optical fibers are aligned into the v-shaped grooves on the fiber mounting surface. The fibers are then attached within the v-shaped grooves by, for example, adhering them. In step 460, the substrate may be packaged with other electronics, for example by attaching the substrate to an integrated circuit board.

While specific embodiments of the present invention have been disclosed, it will be understood by those having ordinary skill in the art that changes may be made to those embodiments without departing from the spirit and scope of the invention.

What is claimed is:

1. An optical platform comprising:
   a monolithic substrate having a device mounting surface on a top portion of the monolithic substrate, wherein the monolithic substrate extends across the device mounting surface of the top portion and the device mounting surface is adapted to mount an optical device that transmits a laser beam down through the monolithic substrate that extends across the device mounting surface of the top portion of the monolithic substrate or receives a laser beam up through the monolithic substrate that extends across the device mounting surface of the top portion of the monolithic substrate;
   a reflecting surface formed within the monolithic substrate by a cutout that extends to the device mounting surface and oriented toward the top portion and positioned between the device mounting surface, a bottom portion of the monolithic substrate and a first side of the monolithic substrate, wherein the bottom portion is axially aligned with the top portion;
   a convex focusing lens coupled to a first side of the monolithic substrate for focusing the laser beam, wherein a convex surface of the convex focusing lens faces an optical fiber; and
   at least one fiber bed extending from the first side and axially aligned with the top portion and the bottom portion for positioning the optical fiber that conveys the laser beam;
   wherein the reflecting surface re-directs the received or transmitted laser beam between the focusing lens and the optical device.

2. The optical platform according to claim 1, wherein the focusing lens has a magnification of less than unity.

3. The optical platform according to claim 1, wherein the focusing lens is integrally formed with the optical platform.

4. The optical platform according to claim 1, wherein the focusing lens is attached to the optical platform.

5. The optical platform according to claim 1, wherein the device mounting surface of the optical platform is adapted for receiving optical devices that are mounted using a flip-chip bonding technique.

6. The optical platform according to claim 1, wherein the device mounting surface is coated with metallic layers to serve as electrical connections and groundings too the optical device.

7. The optical platform according to claim 1, wherein the fiber bed is a v-shaped groove formed in a fiber mounting surface of the optical platform.

8. The optical platform according to claim 1, wherein the optical platform is made of polymer material fabricated through injection molding.

9. The optical platform according to claim 8, wherein the polymer material is PMMA.

10. The optical platform according to claim 1, wherein the optical platform is made of glass material fabricated through transfer molding.

11. An optical platform comprising:
   a monolithic substrate having a device mounting surface on a top portion of the monolithic substrate, wherein the monolithic substrate extends across the device mounting surface of the top portion and the device mounting surface is adapted to mount an optical device that transmits a laser beam down through the monolithic substrate that extends across the device mounting surface of the top portion of the monolithic substrate or receives a laser beam up through the monolithic substrate that extends across the device mounting surface of the top portion of the monolithic;
   a reflecting surface formed within the monolithic substrate by a cutout that extends to the device mounting surface and oriented toward the top portion and positioned between the device mounting surface, a bottom portion of the monolithic substrate and a first side of the monolithic substrate, wherein the bottom portion is axially aligned with the top portion;
   an array of convex focusing lenses coupled to a first side of the monolithic substrate for focusing the laser beams, wherein a convex surface of each convex focusing lens faces an optical fiber; and
   an array of fiber beds extending from the first side and axially aligned with the top portion and the bottom portion for positioning optical fibers that convey the laser beams;
   wherein the reflecting surface re-directs the received or transmitted laser beams between the array of focusing lenses and the optical devices.

12. The optical platform according to claim 11, wherein the reflecting surface re-directs the laser beams to the array of focusing lenses which focuses the beams into respective optical fibers.

* * * * *

UNITED STATES PATENT AND TRADEMARK OFFICE
CERTIFICATE OF CORRECTION

| | |
|---|---|
| PATENT NO. | : 7,289,701 B2 |
| APPLICATION NO. | : 10/386435 |
| DATED | : October 30, 2007 |
| INVENTOR(S) | : Dennis Lam et al. |

It is certified that error appears in the above-identified patent and that said Letters Patent is hereby corrected as shown below:

On the title page, item [75] 3rd Inventor should read --Sio Kuan Lam--.

Signed and Sealed this

First Day of July, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,289,701 B2 |
| APPLICATION NO. | : 10/386435 |
| DATED | : October 30, 2007 |
| INVENTOR(S) | : Dennis Lam et al. |

It is certified that error appears in the above-identified patent and that said Letters Patent is hereby corrected as shown below:

On the title page, item [75] Inventors: "S.K. Lam" should read --Sio Kuan Lam--.

Signed and Sealed this

Twenty-second Day of July, 2008

JON W. DUDAS
*Director of the United States Patent and Trademark Office*